C. H. Cushman,
Hose Coupling.

Nº 101,403.   Patented Mar. 29, 1870.

Witnesses.
M. S. Hopkins
E. Sheen

Inventor.
C. H. Cushman

C. H. Cushman,
Hose Coupling.
N° 101,403. Patented Mar. 29, 1870.
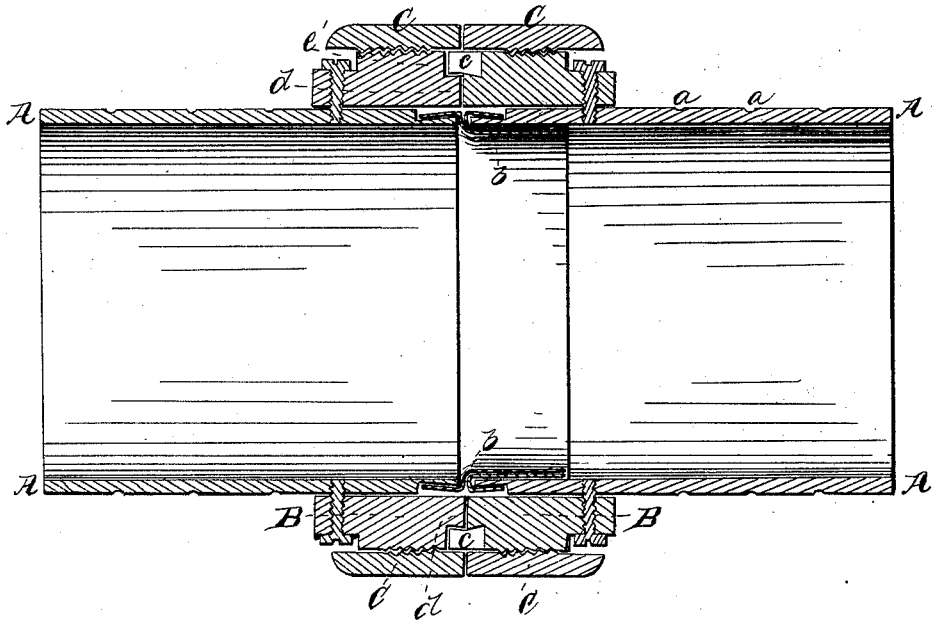
Witnesses.
M. S. Hopkins
E. Spear
Inventor.
C H Cushman

UNITED STATES PATENT OFFICE.

CHARLES H. CUSHMAN, OF ALEXANDRIA, VIRGINIA.

IMPROVEMENT IN HOSE-COUPLINGS.

Specification forming part of Letters Patent No. 101,403, dated March 29, 1870.

*To all whom it may concern:*

Be it known that I, CHARLES H. CUSHMAN, of Alexandria, in the county of Alexandria and State of Virginia, have invented a new and useful Improvement in Hose Couplings; and I do hereby declare that the following is a full and exact description of the same, reference being had to the accompanying drawings, and to the letters of reference marked thereon.

This invention relates to couplings for connecting together different lengths of hose or pipe of any kind intended to be used for the transmission of fluids or gases.

It consists of certain improvements in the structure of and in the method of connecting and securing together the interlocking parts of such couplings, and in preventing the escape at the junction thereof of the fluids or gases while being transmitted through the hose or pipe and coupling, all as hereinafter fully set forth, and as shown in drawings annexed and forming a part of this specification.

Figure 1:
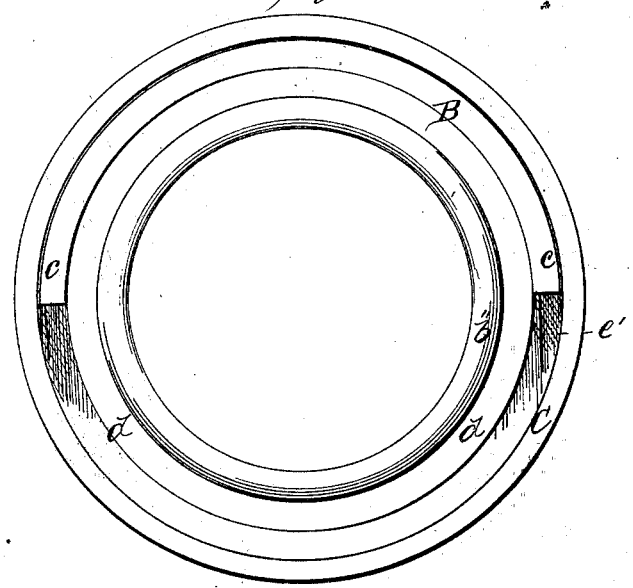
Figure 2:
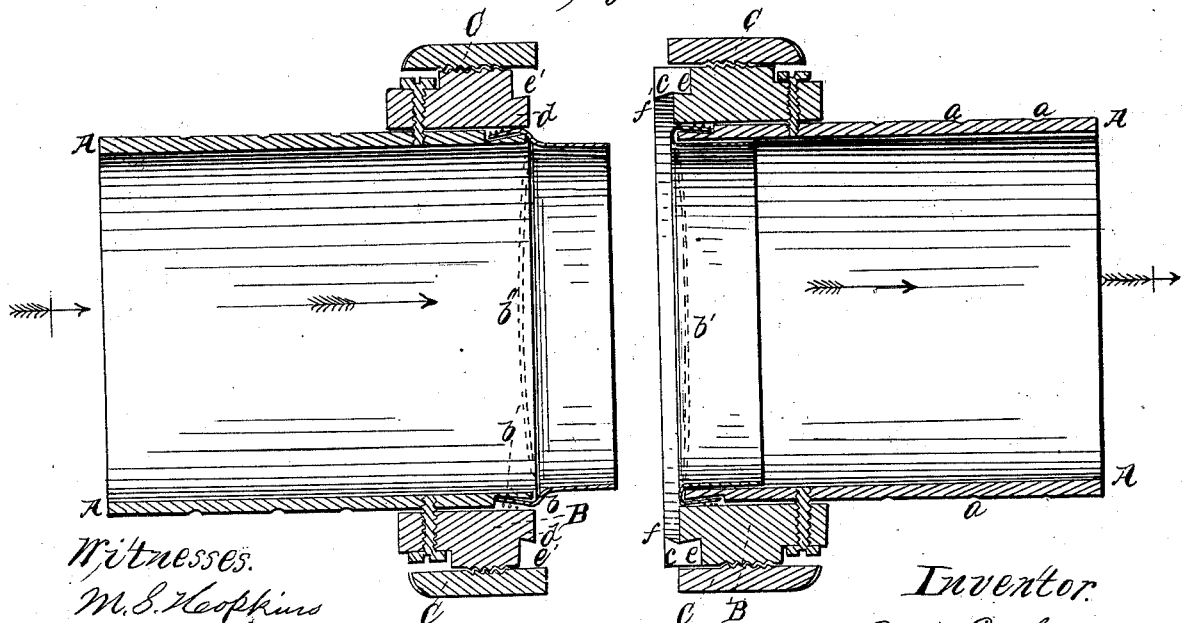

In the drawings, Figure 1 shows a plan view of the end of one or either of the interlocking parts at the plane of junction. Fig. 3 shows a view of a longitudinal section through the middle of the coupling. Fig. 2 shows the same view of any two of the portions of the coupling ready to be connected and the operation of the device for preventing the escape of the fluids or gas.

The same letters and characters refer to identical parts in the several drawings.

A A is a tube or pipe of proper size, and of any suitable material, formed, when hose is to be attached, with grooves $a\,a$ around that part over which the hose is to be slipped and fastened in the ordinary manner. The end of this pipe or tube, or the tube-pipe or hose itself, may be used directly with proper device, which is to be connected with an end of another, is turned down or rabbeted, as shown at $b$, so as to form a seat, beveled or parallel, for the reception of portion of one end of a tube or pipe, of rubber or other equivalent material, which is intended to be secured thereupon. The surface of this seat may be roughened or ragged, for the better security against slipping off of this rubber tube. One end of a rubber tube, $b'$, of proper length and thickness, and of a diameter or circumference less than the interior one of the metallic tube, is stretched and slipped over this seat, as shown, shrinking thereupon, and being further retained in place, if necessary, by a wire or other fastening wound around it. The remaining portion of the rubber ring, so long as not operated upon by any expansive force, as that of a current of water, retaining as much as possible its original diameter, will form an annular curtain or perforated diaphragm, $b''$, over and covering a portion of the orifice of the metal tube from the circumference inward toward the center to the extent of the difference of the diameter of the two tubes. It is, however, free to be expanded in either direction by any passing current of sufficient force. Over this and a portion of the metal tube a band or ring, B, fits closely, and is retained in place by screws or other equivalent means. This band, with its duplicate upon another section of pipe or hose, forms the means of connection between the two. Each is formed with a projecting lip, $c\,c$, extending around half its circumference, and a seat, $d\,d$, occupying the other half of the circumference of the end of the rings. These rings are pushed so far upon the metal tube as to leave only the lip of the ring projecting beyond the end of the tube, so that the rubber rings covering the ends of opposite tubes are slightly compressed in bringing them together.

The parts are so fitted that, when brought together, the lip of each shall fit into the seat of the other sufficiently close to produce a slight compression of the rubber tubes, as above mentioned, for which purpose, and also to allow for any battering or other slight change of original form, these lips and seats are moreover recessed in opposite direction and in beveled form, as shown in the drawings, the structure being such that the lips lock upon the seats and the seats into the lips by a lateral or transverse movement, and must be separated in the same manner.

In the drawing, $e$ is the beveled recess of the seat, and $f$ that of the projecting lip, the other part showing only the corresponding beveled recess of the seat on the opposite section of the coupling. The ends of the semicircular lips may also be beveled so as to interlock.

Over each of the rings B B moves a covering ring, C, carried forward by threads of a screw cut on its interior surface and on the exterior surface of the ring B. These outer rings are so formed and adjusted that they may be screwed forward so as to meet over the center of the lapping parts of the coupling, or either may cover the joint entirely; but it is deemed better to provide two. They may be suitably milled on the outer surface to afford a better hold for the hand, which ordinarily will be sufficient for the purpose of screwing them up, or they may be provided with a beveled mortise on the rear edge or elsewhere, or any other suitable device which does not project to receive a proper instrument for turning them if the force of the hand is not sufficient.

Having thus explained the construction of this coupling, its method of connecting and its general operation may be described, as follows: The contiguous ends or interlocking parts of different sections being brought together, they are fitted to each other by a lateral or transverse movement, and the lip on each is placed on the seat of the other, causing the curtains or diaphragms to be brought into contact side by side and slightly pressing each other. The outer rings, C C, are then moved forward to cover the lips, or either of them to cover both, Fig. 3, and prevent any lateral movement of the parts which are thus securely locked together. The water or other fluid being now forced through the continuous tube thus formed, in either direction, coming in contact with the rubber curtains, forces them to expand into a tube-shape in the direction of its motion, so that the foremost one is turned back upon the interior surface of its own pipe or tube of metal, and the rear one is carried over and across the junction of the two tubes and firmly pressed upon the foremost one, forming a self-adjusting packing, which operates to prevent any leakage at the joint just in proportion to the pressure of the water upon its surface over that joint, so that the greater the pressure of the current flowing through the hose, and consequently the greater the tendency to leakage or escape, the more closely will the rubber flap or curtain be pressed over the junction of the two parts, and thus all leakage or escape be prevented.

The parts on each end being also counterparts, any two will fit each other however the hose may be reversed, so that there can be no failure to couple or necessity for turning the sections of hose, and, as the flaps or curtains cover equally well in either direction, the water can be forced equally well from either end.

As the outer rings serve simply to prevent lateral displacement, they are subject to no strain of importance, and can always be easily moved by hand, and further as they need be moved back only far enough to uncover the lip on each, it is not necessary that the connection of the thread should be lost, and time expended in its recovery, or risk incurred of its mutilation, as is the case with couplings now in use.

I do not confine myself to the precise forms shown, but,

Having thus fully described the principles of my invention, what I claim, and desire to secure by Letters Patent of the United States, is—

1. The hose-coupling formed to lock by side movement when the parts are so constructed that any two may fit together, substantially as set forth.

2. Flaps arranged to cover the juncture of the two parts by the pressure of the current in either direction, as set forth.

3. The rings B B, with their beveled lips and seats and covering-rings C C, one or both, as set forth.

4. The flexible rings or flaps set on the rabbeted ends of the rings, and operating as set forth.

5. The combination of the rubber flaps, one or both, the rings B B C C, and hose, all constructed and operating as set forth.

This specification signed and witnessed this 2d day of March, 1870.

CHARLES H. CUSHMAN.

Witnesses:
M. S. HOPKINS,
ELLIS SPEAR.